May 24, 1955      C. W. BAUER      2,708,935
CORN HUSKER HAVING KERNEL SAVING MEANS
Filed July 16, 1953      2 Sheets-Sheet 2
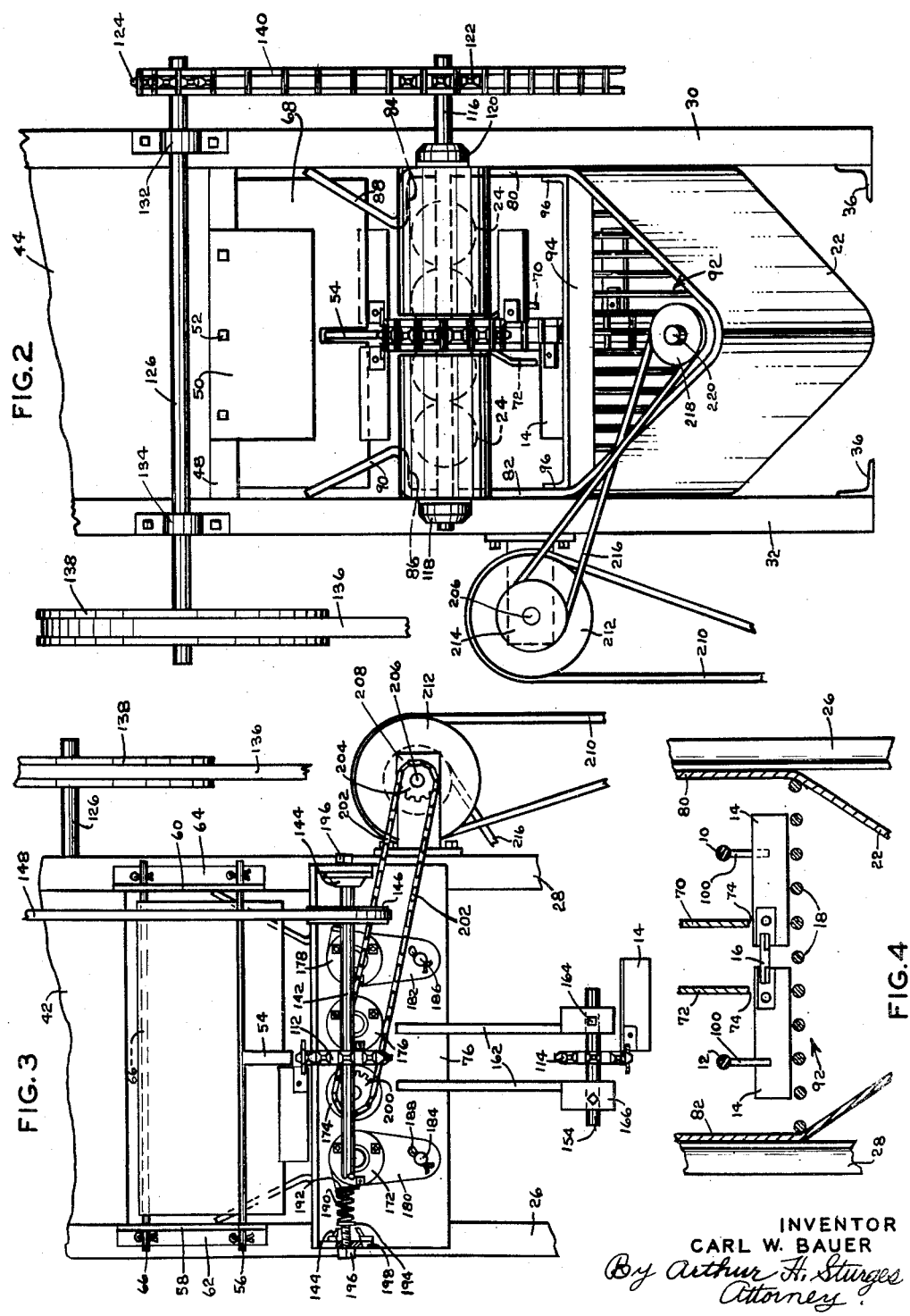
INVENTOR
CARL W. BAUER
By Arthur H. Sturges
Attorney

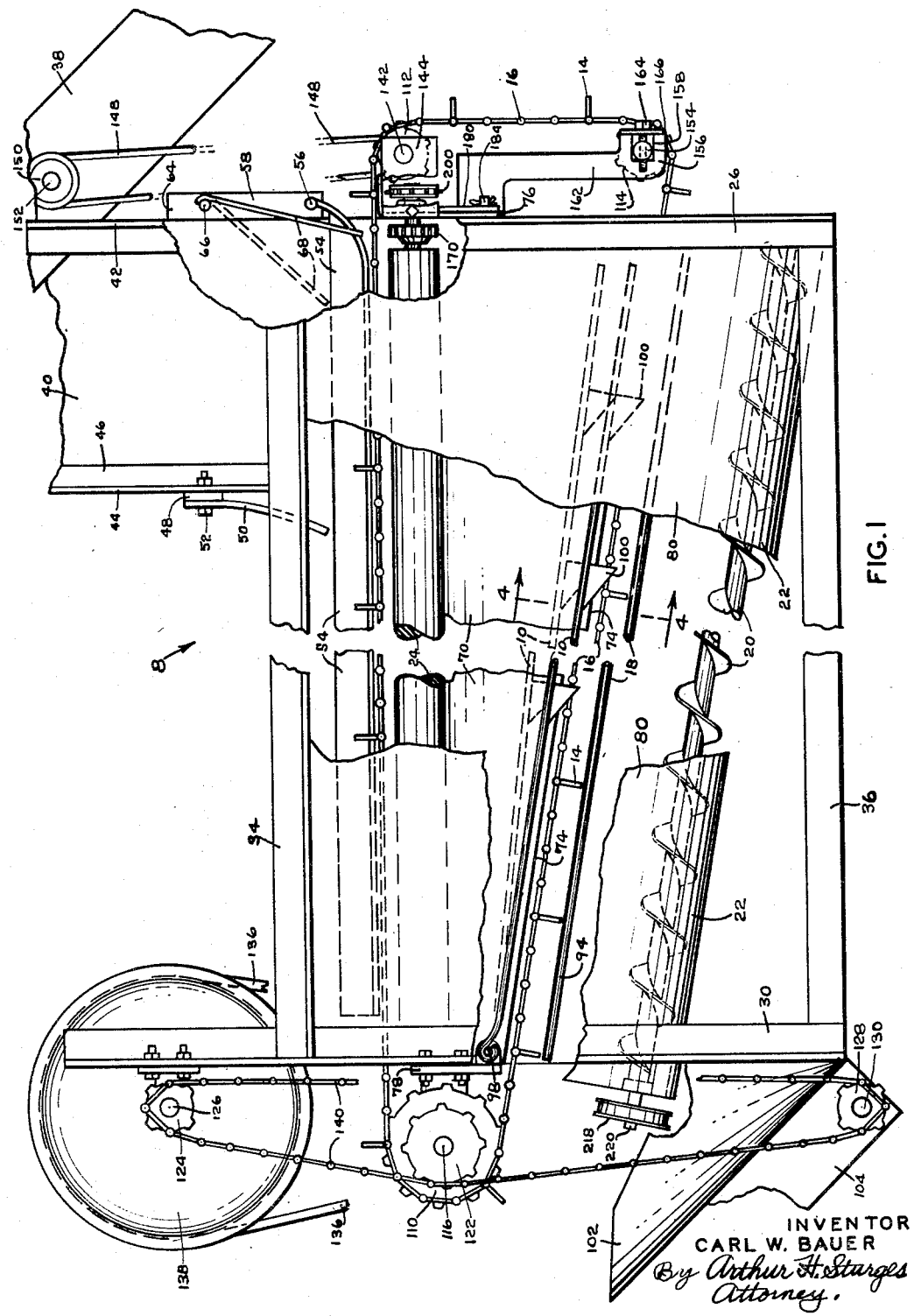

United States Patent Office 2,708,935
Patented May 24, 1955

2,708,935

CORN HUSKER HAVING KERNEL SAVING MEANS

Carl W. Bauer, Hildreth, Nebr.

Application July 16, 1953, Serial No. 368,363

3 Claims. (Cl. 130—5)

This invention relates to corn harvesting machinery and particularly cleaners adapted to be used in combination with snapping rolls of corn pickers for recovering grains of corn unintentionally removed from ears of corn by husking rolls, and in particular a husking bed positioned below the husking rolls and provided with conveying and kicking means whereby the husks are carried over separator rods and projected upwardly into the air to facilitate shaking grains of corn therefrom.

The purpose of this invention is to eliminate waste, and particularly to save grains of corn accidentally shelled from ears of corn in the operation of husking in which the husks are removed from the ears by husking rolls.

There are numerous types of corn harvesting machines that are mounted on a tractor and that are adapted to travel through a corn field embracing two rows of corn and removing ears from stalks with the stalks remaining in the field and with the ears, which have been removed with snapping rolls conveyed to husking rolls over a husking bed. The husking rolls peel off the husks which are deposited upon the ground and the ears of corn are conveyed to hoppers and the like.

In removing the husks from the ears grains or kernels of the corn are removed from the ears and in many husking beds such kernels are deposited upon the ground with the husks, resulting in waste that may amount to three or four bushels each day with one machine.

With this thought in mind this invention contemplates an improved husking bed wherein the kernels drop with the husks upon agitating rods above a screen with flights on an endless conveyor chain scraping the kernels and husks over the screen and also with the flights kicking the rods upwardly projecting the husks into the air to further facilitate separating the kernels from the husks.

The object of this invention is, therefore, to provide means for incorporating elements in a husking bed of a corn harvesting machine which definitely separate kernels or grains of corn unintentionally removed from ears by husking rolls from the husks whereby the kernels may be recovered.

Another object of the invention is to provide means in a husking bed of a corn picker for shaking leaves and husks to remove kernels of corn therefrom in which the leaves and husks are kicked into the air before being conveyed from the husking bed and deposited upon the ground.

Another important object of the invention is to provide a flight conveyor for moving corn over husking rolls of a corn harvester in which the same conveyor is used for scraping husks and loose kernels of corn over a screen for separating the kernels from the husks.

A further object of the invention is to provide conveying means for carrying ears of corn over husking rolls in which the conveying means is used for scraping kernels and husks over a screen and also for actuating agitator rods which project the leaves and husks into the air above the screen.

A still further object is to provide means in a husking bed for causing ears of corn to be positioned parallel to husking rolls as the ears are conveyed over the rolls.

And a still further object is to provide an improved husking bed that substantially eliminates waste of accidentally removed kernels of corn in which the husking bed is of a simple and economical construction.

With these and other objects and advantages in view the invention embodies a husking bed having spaced pairs of husking rolls positioned above parallel agitator rods, a screen, and a trough or receiving hopper, an endless chain having flights thereon positioned to travel over the husking rolls and between the agitator rods and screen, transmission elements for operating the parts from the power take-off of a tractor upon which the machine is mounted, and suitable elevators and hoppers for feeding corn to the husking rolls and receiving the kernels separated from the husks.

Other features and advantages of the invention will appear from the following description taken in connection with the drawings, wherein:

Figure 1 is a foreshortened side elevational view of the improved husking bed, parts of the cowling or housing being broken away to show parts of the husking rolls, agitator rods, screen and conveyors and said agitator rods being shown in lower positions in full lines and in upper positions in dotted lines.

Figure 2 is a rear elevational view of the husking bed, also with parts broken away.

Figure 3 is a front elevational view of the husking bed also with parts broken away and with parts, such as the flight conveyor chain omitted.

Figure 4 is a detail showing a section taken on line 4—4 of Figure 1 illustrating the relative positions of the agitator rods, screen, and flights of the conveyor.

While one embodiment of the invention is illustrated in the above-referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout and in which the numeral 8 refers to the husking bed in general, numerals 10 and 12 agitator rods actuated by flights 14 on an endless chain 16 of a conveyor, numeral 18 a screen positioned below the agitator rods and being of a mesh adapted to pass kernels of corn, numeral 20 a screw conveyor positioned in an elongated hopper 22 below the screen, and numeral 24 the husking rolls which are positioned above the agitator rods and screen and below the upper forwardly traveling section of the conveyor.

The husking bed structure includes posts 26 and 28 at the front and 30 and 32 at the rear and the posts are connected with longitudinally disposed upper beams 34 and lower beams 36. The posts are also supported by conventional transversely positioned members.

The forward end of the husking bed is supplied with ears of corn from a corn picker roller bed by an elevator 38 which deposits the ears in a hopper having side walls 40 and end walls 42 and 44.

The rear portion of the hopper is provided with posts 46 upon which a transverse bar 48 is supported and a flexible baffle 50, preferably of rubberized cloth, is secured to the bar with bolts 52. The baffle provides a cover for the rear end of the opening at the lower edge of the hopper and distributes ears of corn to pairs of husking rolls at both sides of a vertically disposed separating plate 54. The plate 54 is T-shaped in cross section and is positioned between the pairs of husking rolls and also between the flights 14 which extend from opposite sides oft he chain 16. The forward end of the separator plate or bar 54 is secured to a rod 56 which is pivotally mounted in outwardly extended flanges 58 and 60 of angle bars 62 and 64, respectively, as shown in Figures 1 and 3. Another rod 66, spaced above the rod 56 is also pivotally mounted in the flanges 58 and 60 and this upper rod carries a baffle or kick plate 68 which hangs downwardly in the forward end of the hopper. The baffle 68 is positioned whereby the lower edge is adapted to be engaged by the flights 14 whereby the baffle is kicked outwardly, to the position shown in dotted lines in Figure 1, by the flights so that the corn is kicked upwardly and rearwardly as it falls through the hopper and as it is deposited upon the flights and husking rolls.

Leaves dropping from the husking rolls or rollers 24 are divided by vertically disposed baffle plates 70 and 72 the upper edges of which come together between the pairs of rolls, as shown by the dotted lines in Figure 2, and the lower edges of which extend to lines 74 spaced above the upper edges of the flights 14. The baffle plates 70 and 72 are supported at the front end of the husking bed with a transverse plate 76 and at the rear with a similar plate 78. The husking bed is provided with side plates 80 and 82, the lower portions of which converge to form the trough or hopper 22, and as shown in Figure 2, the upper edges extend inwardly to provide horizontal sections 84 and 86 from which inclined baffles 88 and 90 extend, respectively.

The screen 18 is preferably formed with spaced parallel rods 92, the ends of which are connected with cross plates 94 and, as shown in Figure 2, flanges 96 on the ends of the plates 94 are secured to the inner surfaces of the side plates 80 and 82.

The agitator rods 10 and 12 are pivotally mounted on a transverse bar 98 on the inside of the plate 78 and extended between the posts 30 and 32. The rods 10 and 12 are provided with triangular shaped webs 100 that are positioned to be engaged by the flights 14 of the conveyor chain, and as the flights strike the webs the agitators are kicked upwardly thereby throwing or projecting the falling leaves and husks upwardly in the husking bed to shake kernels of corn therefrom. The kernels drop through the rods 92 into the hopper 22 and the leaves and husks are carried to the front of the husking bed and deposited upon the ground. A hopper 102 is provided at the rear of the husking bed for receiving the kernels and an elevator 104 is positioned to receive the kernels from the hopper. The kernels may be conveyed by the elevator 104 to wagons or trucks following the machine.

The endless conveyor chain 16 from which the flights 14 extend is trained over a sprocket 110 at the rear end of the husking bed and over an upper sprocket 112 and a lower sprocket 114 at the forward end. The sprocket 110 is mounted on a shaft 116 which is journaled in bearings 118 and 120 extended from the posts 30 and 32, respectively, and the shaft is provided with an extended end on which a sprocket 122 is mounted. The sprocket 122 is aligned with a sprocket 124 on an upper shaft 126 and a sprocket 128 on a lower shaft 130, the lower shaft providing a tail shaft for the elevator 104, and the upper shaft 126, which is mounted by bearings 132 and 134, providing a driving shaft, being driven from a power take-off of a tractor upon which the husking bed is mounted by a belt 136 that is trained over a pulley 138 on the end of the shaft. A chain 140 is trained over the sprockets 122, 124, and 128.

The sprocket 112 is positioned on a shaft 142 that is journaled in bearings 144 extended from the plate 76, and this shaft is also provided with a pulley 146 over which a belt 148 is trained. The belt is also trained over a pulley 150 on a shaft 152 which forms the head shaft of the elevator 38. By this means the elevator for carrying ears of corn from the snapping rolls to the husking rolls is driven from the power take-off of the tractor.

The sprocket 114 is mounted on a shaft 154 that is journaled in bearings 156 in longitudinally disposed slots 158 in the lower ends of hangers 160 and 162 which extend downwardly from the plate 76, and the bearings are actuated in the slots by take-up screws 164 threaded through plates 166 covering the forward ends of the slots, and secured to the hangers, such as by welding.

The husking rollers or rolls 24 are provided with meshing gears 170 on the forward ends whereby the rolls of each pair turn together, and as shown in Figure 3, the pair of rollers on one side of the center of the husking bed is journaled in bearings 172 and 174, and the pair on the opposite side in bearings 176 and 178. The bearings 174 and 176 of the rollers adjacent the center are bolted to the plates 76 and 78, respectively, and the bearings 172 and 178 are carried by arms 180 and 182, the lower ends of which are pivotally secured to the plates 76 and 78 with studs 184 and 186. The studs are provided with cotter pins 188 or the like to prevent accidental displacement of the bearings.

As illustrated in Figure 3, the bearings 172 and 178 are urged inwardly by springs 190 which bear against bosses 192 on the bearings at one end, and which are held by collars 194 on threaded studs 196 which are threaded in plates 198, at the other. By this means the outer husking rolls are resiliently urged toward the inner rolls and the tension of the springs is adjustable.

The roller journaled in the bearings 174 is provided with a sprocket 200 over which a chain 202 is trained and the chain is also trained over a sprocket 204 on a counter-shaft 206. The shaft 206 is journaled in bearings 208 extended from the sides of the husking bed and a belt 210 which is trained over a pulley 212 on the shaft 206 extends to the power take-off of the tractor which provides driving means for the shaft. The shaft 206 is also provided with a pulley 214 and a belt 216 which is trained over the pulley 214 and also over a pulley 218 on a shaft 220 extended from the screw conveyor 20 provides driving means for the conveyor. The belt 216 is twisted, as shown in Figure 2, to reverse the direction of rotation of the screw of the conveyor.

It will be understood that with the hopper 22 of the screw conveyor inclined as shown, the conveyor is necessary, however, the hopper or a trough may be positioned so that the kernels move by gravity from the screen 18 to the hopper 102, whereby the conveying means would not be required.

This improved husking bed provides a saving of kernels or grains of corn, broken in the husking process, positively separating the kernels from the husked leaves, conveying the kernels forwardly of the husking bed and delivering the kernels with cleaned ears of corn to a farm wagon following the corn picker. This is accomplished by the use of one conveyor chain for each bed, using the upper section for carrying the corn over the husking rolls and the lower section for ejecting the leaves and husks. The entire husking bed includes comparatively few parts and the elimination of many parts of similar conventional devices insures little maintenance and extended life of the machine.

From the foregoing specification it will become apparent that the invention disclosed will adequately accomplish the functions for which it has been designed and in an economical manner and that its simplicity, accuracy and ease of operation are such as to provide a relatively inexpensive device considering what it will accomplish and that it will find an important place in the art to which it appertains, when once placed on the market.

It is thought that persons skilled in the art to which the invention relates will be able to obtain a clear understanding of the invention after considering the description in connection with the drawings. Therefore, a more lengthly description is regarded as unnecessary.

Changes in shape and arrangement of details and parts such as come within the purview of the invention claimed may be resorted to in actual practice, if desired.

Having now described the invention that which is claimed to be new and desired to be procured by Letters Patent, is:

1. In a corn harvesting bed, the combination which comprises spaced pairs of horizontally disposed husking rolls, a supporting structure in which the rolls are rotatably mounted, a feed hopper at one end of the structure and positioned to supply ears of corn to the husking rolls, an elevator carried by the structure and adapted to supply ears of corn to the feed hopper, a grain receiving hopper positioned at the end of the structure opposite to the end in which the feed hopper is positioned, a longitudinally disposed inclined screen mounted in the structure and positioned below the husking rolls, an inclined screw conveyor also mounted in the structure and positioned below the screen, an endless chain having laterally disposed flights thereon trained over sprockets rotatably mounted in the structure and positioned whereby an upper section of the chain travels longitudinally over the husking rolls and a lower or return section travels upwardly over the inclined screen, agitator rods having spaced triangular-shaped webs on lower surfaces thereof pivotally mounted at one of the ends thereof in the structure and above the screen and positioned whereby inclined surfaces of the webs are engaged by the flights of the chain with the result that the agitator rods are kicked upwardly by the flights, said screw conveyor being positioned to deposit grain in the grain receiving hopper, and means for actuating the parts.

2. In a corn husking bed, the combination which comprises spaced pairs of horizontally disposed husking rolls, a supporting structure in which the rolls are rotatably mounted, a feed hopper at one end of the structure and positioned to supply ears of corn to the husking rolls, an elevator carried by the structure and adapted to supply ears of corn to the feed hopper, a grain receiving hopper positioned at the end of the structure opposite to the end in which the feed hopper is positioned, a longitudinally disposed inclined screen mounted in the structure and positioned below the husking rolls, an inclined screw conveyor also mounted in the structure and positioned below the screen, an endless chain having laterally disposed flights thereon trained over sprockets rotatably mounted in the structure and positioned whereby an upper section of the chain travels longitudinally over the husking rolls and a lower or return section travels upwardly over the inclined screen, a kick plate pivotally mounted in the feed hopper and positioned to be engaged by the flights of the chain for agitating ears of corn in the feed hopper, agitator rods having spaced triangular-shaped webs on lower surfaces thereof pivotally mounted at one of the ends thereof in the structure, above the screen, and positioned whereby inclined surfaces of the webs are engaged by the flights of the chain wherein the agitator rods are kicked upwardly by the flights to separate husks removed from ears of corn from kernels of corn, said screw conveyor being positioned to deposit grain in said grain receiving hopper, and means for actuating the parts of the corn husking bed.

3. In a corn husking bed, the combination which comprises spaced pairs of horizontally disposed longitudinally positioned husking rolls, a supporting structure in which the rolls are rotatably mounted, a feed hopper at one end of the structure positioned to supply ears of corn to the husking rolls, an elevator carried by the structure and positioned to supply ears of corn to the feed hopper, a grain receiving hopper positioned at the end of the structure opposite to the end in which the feed hopper is positioned, a longitudinally disposed inclined screw conveyor mounted in the structure below the husking rolls and positioned with the high end at the rear of the structure, a plurality of spaced longitudinally disposed rods positioned between the husking rolls and screw conveyor providing a screw, said rods being inclined upwardly toward the rear of the structure, an endless chain having laterally disposed flights thereon trained over sprockets rotatably mounted in the structure and positioned whereby an upper section of the chain travels longitudinally over the husking rolls and a lower or return section travels upwardly over the spaced rods, agitator rods having spaced triangular-shaped webs on lower surfaces thereof pivotally mounted at one of the ends thereof in the structure, above the rods forming the screen, and positioned whereby inclined surfaces of the webs are engaged by the flights of the chain whereby said agitator rods are kicked upwardly intermittently by the flights, said screw conveyor being positioned to deposit grain in said grain receiving hopper, and means for actuating the parts of the corn husking bed.

References Cited in the file of this patent

UNITED STATES PATENTS

| | | |
|---|---|---|
| 574,136 | Conner et al. | Dec. 29, 1896 |
| 796,233 | Mann | Aug. 1, 1905 |
| 833,700 | Still | Oct. 16, 1906 |
| 1,049,400 | Rollins et al. | Jan. 7, 1913 |
| 1,635,925 | Carlson | July 12, 1927 |
| 2,298,198 | Coultas et al. | Oct. 6, 1942 |
| 2,622,382 | Slavens | Dec. 23, 1952 |